United States Patent

Ernst et al.

[11] Patent Number: 5,910,463
[45] Date of Patent: Jun. 8, 1999

[54] CATALYST SUPPORTS, SUPPORTED METALLOCENE CATALYSTS AND THEIR USE FOR THE PREPARATION OF POLYOLEFINS

[75] Inventors: Eberhard Ernst, Katsdorf; Jens Reussner, Traun; Wolfgang Neissl, Lichtenberg, all of Austria

[73] Assignee: Borealis AG, Austria

[21] Appl. No.: 08/891,994

[22] Filed: Jul. 14, 1997

Related U.S. Application Data

[63] Continuation of application No. 08/458,484, Jun. 2, 1995, abandoned.

[30] Foreign Application Priority Data

Jun. 3, 1994 [AT] Austria ................................. 1130/94

[51] Int. Cl.$^6$ ........................................ C08F 4/02
[52] U.S. Cl. .................. 502/107; 502/152; 502/155; 502/405; 502/407; 502/415; 502/439; 526/129; 526/160; 526/943
[58] Field of Search ............................ 502/107, 152, 502/154, 155, 156, 405, 407, 408, 415, 439

[56] References Cited

U.S. PATENT DOCUMENTS

| | | |
|---|---|---|
| 4,169,926 | 10/1979 | McDaniel . |
| 4,530,912 | 7/1985 | Pullukat et al. . |
| 5,240,894 | 8/1993 | Burkhardt et al. . |
| 5,276,117 | 1/1994 | Tomotsu et al. . |
| 5,278,264 | 1/1994 | Spaleck et al. . |
| 5,329,033 | 7/1994 | Spaleck et al. . |
| 5,380,687 | 1/1995 | Mangold et al. . |
| 5,468,702 | 11/1995 | Jejelowo ................. 502/104 |
| 5,648,310 | 7/1997 | Wasserman et al. ........... 502/120 |

FOREIGN PATENT DOCUMENTS

| | | |
|---|---|---|
| 1317411 | 5/1993 | Canada . |
| 0299391A1 | 1/1989 | European Pat. Off. . |
| 0302424A1 | 2/1989 | European Pat. Off. . |
| 0323716A1 | 7/1989 | European Pat. Off. . |
| 0530647A1 | 3/1993 | European Pat. Off. . |
| 0563917A1 | 10/1993 | European Pat. Off. . |
| 0578838A1 | 1/1994 | European Pat. Off. . |
| 0585544A1 | 3/1994 | European Pat. Off. . |
| 0638595A2 | 2/1995 | European Pat. Off. . |
| 870242 | 3/1953 | Germany . |
| 296898A5 | 12/1991 | Germany . |
| 4139262A1 | 6/1993 | Germany . |
| 578008 | 3/1974 | U.S.S.R. . |
| 422255 | 10/1976 | U.S.S.R. . |
| 597201 | 3/1986 | U.S.S.R. . |
| WO91/09882 | 7/1991 | WIPO . |

OTHER PUBLICATIONS

Tsutsui et al., *Polymer*, 32(14), 2671–2673 (1991).
C. Janiak et al., *J. Polymer Sci.*, Part A: Polymer Chemistry Edition 31, No. 12 (1993).

*Primary Examiner*—David W. Wu
*Attorney, Agent, or Firm*—Wenderoth, Lind & Ponack, L.L.P.

[57] ABSTRACT

Process for preparing a catalyst support, in which a hydrophilic, macroporous, finely divided aluminum oxide, silicon oxide, titanium oxide or zirconium oxide or a mixture or mixed oxide thereof is dried at from 110 to 800° C., then reacted with an aluminoxane and subsequently with polyfunctional organic crosslinkers. In a further step, the catalyst support can be mixed with a reaction product of metallocenes and activators, giving a supported metallocene catalyst which is used, in particular, for the polymerization of olefins.

4 Claims, No Drawings

CATALYST SUPPORTS, SUPPORTED METALLOCENE CATALYSTS AND THEIR USE FOR THE PREPARATION OF POLYOLEFINS

This application is a continuation of now abandoned application Ser. No. 08/458,484, filed Jun. 2, 1995, now abandoned.

The invention relates to catalyst supports based on aluminum oxides, silicon oxides, titanium oxides or zirconium oxides, metallocene catalysts prepared using these catalyst supports and their use in olefin polymerization.

Polypropylene can be prepared, for example as described in U.S. Pat. No. 5,278,264 or U.S. Pat. No. 5,329,033, by use of catalysts which comprise a metallocene and an activator or cocatalyst, for example methylaluminoxane or perfluorotetraphenylborate. However, use of such homogeneous catalysts in the polymerization gives powders having only a low bulk density. The particle morphology of such products can in principle be somewhat improved by a specific pretreatment of the metallocene with the cocatalyst (EP 302 424). However, a disadvantage of such a process is, in particular, the heavy deposit formation in industrial reactors (EPA 563 917). The use of methylaluminoxane as support material which is insoluble in aliphatic solvents does give a certain improvement in the activity, but likewise gives only pulverulent products (Polymer 1991, Vol. 32, 2671–2673). In addition, the process is uneconomical. Supporting the metallocene on oxidic materials, such as silicon oxide or aluminum oxide, with pretreatment of the starting material, which may be partially dewatered, with the cocatalyst is a method known from WO 91/09882, which method is used in the homopolymerization and copolymerization of ethylene. However, the particle size of the particulate polymer is here essentially determined by the particle size of the support material, so that limits are placed on increasing the grain size in comparison with conventional magnesium chloride supported catalysts.

It is therefore an object of the invention to develop a process which allows the particle size and the particle size distribution of polyolefins prepared using metallocene catalysts to be controlled in a targeted manner.

Surprisingly, it has now been found that the use of a specific support material and subsequent fixing of a reaction product of a metallocene and a cocatalyst or activator enables the particle size distribution of the polymer to be set in a targeted manner.

The present invention accordingly provides a process for preparing a catalyst support, wherein
a) a hydrophilic, macroporous, finely divided aluminum oxide, silicon oxide, titanium oxide or zirconium oxide or a mixture or mixed oxide thereof is dried at from 110 to 800° C.,
b) is reacted with an aluminoxane and subsequently
c) is reacted with polyfunctional organic crosslinkers.

The invention further provides the catalyst support prepared by the process of the invention. The catalyst support of the invention is prepared in a multistep reaction from an inorganic oxide:

In the first step (a), a hydrophilic, macroporous and finely divided aluminum, silicon, titanium or zirconium oxide, for example as described in DE-C 870.242 or U.S. Pat. No. 5,380,687, which preferably has no internal surfaces, or a mixture or mixed oxide thereof is dehydrated in a stream of nitrogen or in vacuo at temperatures of from 110 to 800° C. over a period of from 1 to 24 hours. This is followed by a measurement of the concentration. of the surface hydroxyl groups established as a function of the selected drying temperature. Suitable starting materials are, for example, oxidic materials prepared in accordance with DE-C 870.242 or U.S. Pat. No. 5,380,687 by the high-temperature hydrolysis process from gaseous metal chlorides or silicon compounds, but also all other hydrophilic oxidic materials having the properties indicated. The mean primary particle size of the finely divided oxides is at most about 100 $\mu$m, preferably at most about 10 $\mu$m and particularly preferably in the colloidal range, preferably as very finely divided particles at from about 3 to 110 nm. Preference is given to using aluminum oxide C and Aerosil 130 from Degussa.

In the second step (b), the dried oxide is reacted with an aluminoxane, for which purpose it is, for example, suspended in a hydrocarbon-solvent, for example in toluene, in such a way that it is covered by the solvent. Subsequently, it is reacted with an excess of aluminoxane and then dried in vacuo at temperatures of about 20–60° C.

According to the invention, use is made here of an aluminoxane of the formula I for the linear type:

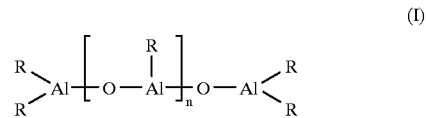

and/or the formula II:

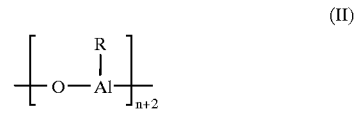

for the cyclic type, where in the formulae I and II the radicals R can be identical or different and are a $C_1$–$C_6$-alkyl group and n is an integer from 1–50. Preferably, the radicals R are identical and are methyl, isobutyl, phenyl or benzyl. The aluminoxane can be prepared in various ways according to known processes. One possibility is, for example, the reaction of aluminum alkyls with aluminum sulfate containing water of crystallization (Hoechst EP-A-302424). In the present invention, preference is given to using commercial methylaluminoxane (MAO, from Witco). The molar ratio of aluminum (as aluminoxane) to surface hydroxyl groups is between 1 and 50, preferably between 1 and 20, particularly preferably between 5 and 10.

In the third step (c), the dried reaction product from the step b is preferably resuspended. The selection of the solvent or suspension medium depends primarily on the solubility of the polyfunctional crosslinker used. If, for example, aliphatic or aromatic diols are used, tetrahydrofuran (THF) or other ethers, for example methyl tertiary-butyl ether, are suitable. Particularly advantageous is the selection of a solvent whose boiling point lies below the decomposition temperature of the solid prepared in step b. The reaction product of the step b suspended in this way is preferably treated with a solution of one or more polyfunctional organic crosslinkers in the same solvent. The reaction mixture is stirred for about 30 minutes and the solvent is then removed at temperatures above its boiling point but below the decomposition temperature of the solid. When using, for example, tetrahydrofuran as solvent, this temperature lies between 70 and 100° C. To eliminate any unbound constituents, the mixture is once again suspended in a solvent such as toluene, stirred for 10 minutes and the washing toluene is decanted.

The solid is subsequently dried in vacuo at temperatures of from about 100° C. to 120° C. until a free-flowing powder of the catalyst support is obtained. Suitable polyfunctional organic crosslinkers to be used according to the invention are all organic compounds having more than one functional group which can react with a metal-carbon bond. Preference is given to using bifunctional crosolinkers. Such bifunctional organic compounds can be, for example, aliphatic or aromatic diols, aldehydes, dicarboxylic acids, primary or secondary diamines, diepoxide compounds. To avoid interfering side reactions or reaction products, which would necessitate additional purification, preference is given to using aliphatic and aromatic diols, secondary amines or diepoxide compounds or mixtures thereof. Particular preference is given to butanediol, hexanediol, decanediol, bisphenol A and 1,4-butanediol diglycidyl ether. In these cases, tetrahydrofuran is preferably used as solvent. Trifunctional or higher functional crosslinkers which can be used are, for example, triethanolamine, glycerol or tetraethylenepentamine.

When using the polyfunctional crosslinkers, there is additionally the opportunity of deactivating, in a further reaction step, unreacted reactive groups with, for example, alkylaluminum compounds, preferably using trimethylaluminum.

The molar ratio between the aluminum applied as aluminoxane in the step b and the crosslinker can vary within a wide range and is between 1 and 100, preferably between 1 and 40, particularly preferably between 5 and 12. It is dependent, in particular, on the type and pretreatment of the metal oxides, the type of aluminoxanes used, the respective molar ratio of Al (as aluminoxane) to surface hydroxyl groups on the metal oxide and the type of crosslinker. Higher molar ratios Al to crosslinker are used here, in particular, when use is made of trifunctional or higher functional crosslinkers which have a correspondingly higher number of crosslinking possibilities.

The invention further provides a catalyst support based on hydrophilic, macroporous, finely divided aluminum oxide, silicon oxide, titanium oxide or zirconium oxide or a mixture or mixed oxide thereof and aluminoxanes, which support is crosslinked using polyfunctional organic crosslinkers. This crosslinked catalyst support, which can be prepared, for example, by the above-described process, has a very low toluene-soluble aluminoxane content which is preferably from 0.01 to 1.4 mol %, in particular from 0.02 to 1.0 mol %, particularly preferably from 0.04 to 0.08 mol %, based on moles of Al in the aluminoxane used, measured at 70° C.

The catalyst support of the invention has a series of characteristic properties. As a result of the crosslinking reaction between the aluminoxane and the polyfunctional organic crosslinker, the specific surface area when using very finely divided metal oxides rises from about 70 to 120 $m^2/g$ to at least 140 to 200 $m^2/g$, preferably to 150 to 170 $m^2/g$ (method of determination: $N_2$ adsorption, BET equation).

When using very finely divided metal oxides, the particle size rises from about 10 to 30 nm to 1 to 10 $\mu m$, preferably to 3 to 6 $\mu m$ (method of determination: transmission electron microscopy TEM). A further effect is the reduction in the solubility of the aluminoxane as a result of the crosslinking reaction. This effect can be evidenced by extraction experiments in suitable organic solvents, for example in toluene, and subsequent aluminum determination on these solutions (method of determination: atomic absorption spectroscopy). If the support oxide used according to the invention, for example alumina C, is reacted with only one aluminoxane, preferably methylaluminoxane, for example in a molar ratio Al(aluminoxane) :OH(support oxide) of from 20 to 10:1, aluminoxane solubilities of from 45 to 60 mol % (based on moles of Al in the methylaluminoxane used) are found after extraction for from one to three hours in toluene, both at room temperature and at 70° C. If the molar ratio of Al(aluminoxane):OH(support oxide) is reduced to less than 10:1, the solubility of the aluminoxane also drops. For example, at a ratio Al:OH=1. 6 the solubility found is 1.5 mol %. The chemical reaction of the aluminoxane applied with organic polyfunctional compounds leads to a stable fixing of the amorphous, crosslinked phase on the support oxide. The degree to which the toluene-soluble starting compounds are dissolved off is virtually negligible. If, for example as in the preparation process described, a crosslinking stop using a polyfunctional organic crosslinker is employed, for example using bisphenol A in a molar ratio of Al(aluminoxane) :bisphenol A of less than 8:1, only traces of soluble constituents (<0.1 mol %) are found after extraction of all catalyst supports in toluene for from one to three hours. After the crosslinking reaction with the polyfunctional organic compounds, a washing stop can also be added. Aluminum determinations on these toluene wash solutions likewise show only traces of soluble aluminoxanes (<0.1 mol %).

The catalyst support of the invention can be advantageously used for the preparation of a supported metallocene catalyst.

The invention accordingly further provides a supported metallocene catalyst (supported catalyst) which contains the reaction product of (a) an above-described catalyst support of the invention with (b) the reaction product of metallocenes and activators. Suitable activators are, for example, aluminoxanes or perfluorotetraphenylborates. Aluminoxanes which can be used are all those types of compounds which have already been mentioned for the preparation of the catalyst support. Preference is given to using aluminoxanes, particularly preferably methylaluminoxanes. It is also possible to use mixtures of various activators.

In principle, any metallocene or mixtures of metallocenes can be reacted with the activators. Possible metallocenes are, for example, unbridged, unsubstituted or substituted cyclopentadienyl, indenyl and fluorenyl compounds of metals of the Group IVb, Vb or VIb of the Periodic Table, for example bis(isopropyldicyclopentadienyl)zirconium dichloride; bridged, unsubstituted or substituted, asymmetric or symmetric cyclopentadienyl, indenyl and fluorenyl compounds of metals of the Group IVb, Vb or VIb of the Periodic Table, for example ethylenebis(indenyl)zirconium dichloride or ethylenebis(ferrocenoindenyl)zirconium dichloride, as are described, for example in DE-A-4417542, U.S. Pat. No. 5,278,264 or EP-A-563.917).

The preparation of the supported metallocene catalyst is carried out by bringing the catalyst support of the invention into contact with the reaction product of metallocenes and activators. For this purpose, the metallocene can, for example, first be mixed with the activator. The mixing is preferably carried out in a solvent. The metallocene is here, for example, dissolved in an inert hydrocarbon and mixed with a solution of the activator, for example the aluminoxane. Suitable inert solvents which can be used are, for example, aliphatic or aromatic hydrocarbons, preferably toluene. The concentration of the activator in the solution is in the region of 5–30% by weight based on the total solution. The metallocenes are preferably used in an amount of $10^{-4}$–1 mole per mole of activator. The mixing time is from 5 minutes to 24 hours, preferably from 5 to 60 minutes. Mixing is carried but at a temperature of from −10 to +70°

C., in particular from 10 to 40° C. The mixing of the metallocene/activator reaction mixture with the catalyst support is preferably carried out in solution. For this purpose, the catalyst support is covered with an inert solvent and subsequently mixed by stirring with the solution of the metallocene-activator complex. Preferred solvents are inert aliphatic and aromatic hydrocarbons. Particular preference is given to using-toluene. The reaction time is from 10 minutes to 24 hours, preferably from 10 to 60 minutes. The reaction is carried out at a temperature of from 0 to 80° C., in particular at from 10 to 50° C.

After the reaction is complete, the solvent is taken off, preferably in vacuo, at temperatures between 10 and 90° C., preferably between 25 and 70° C., and the residue is then washed a plurality of times with a low-boiling, inert aliphatic. Preference is given to using n-pentane. The metallocene content of the supported catalyst is in the range from 0.01 to 10%, preferably from 0.1 to 3%, by weight based on the mass of the total catalyst.

The particle size and the particle size distribution of the catalyst can be controlled, for example, by the reaction procedure via the degree of crosslinking in step c. Under optimum conditions, the catalyst powder is distinguished by the proportion of fines (particle size less than 1 $\mu$m) being particularly low and being only about 1%.

The invention further provides a process for preparing polyolefins by polymerization or copolymerization of olefins, wherein the supported metallocene catalyst of the invention is used as polymerization catalyst, and also provides for the use of supported metallocene catalysts of the invention in the polymerization or copolymerization of olefins to prepare polyolefins.

The catalyst of the invention can be introduced into the polymerization mixture either as a powder or as a suspension in an inert hydrocarbon, for example pentane, hexane, cyclohexane or mineral oils.

The polymerization is carried out in a known manner in solution, suspension or gas-phase processes, continuously or batchwise at a temperature of from −10 to +200° C., preferably from +20 to +80° C.

The supported catalyst of the invention is polymerization-activated without further activating additives. However, it is found to be particularly advantageous to use aluminum alkyls, preferably trimethylaluminum, triethylaluminum or triisobutylaluminum, or alkylaluminoxanes, for example methylaluminoxane, as scavenger and as additional activator. The amount used is, based on the aluminum, 50–5,000 mole, preferably 100–500 mole, per mole of transition metal in the metallocene catalyst.

Polymerization or copolymerization is carried out on olefins of the formula $R^a$—CH=CH—$R^b$. In this formula, $R^a$ and $R^b$ are identical or different and are each a hydrogen atom or an alkyl radical having from 1 to 20 carbon atoms. However, $R^a$ and $R^b$ can also form a ring together with the carbon atoms connecting them. For example, olefins such as ethylene, propylene, 1-butene, 1-hexene, 4-methyl-1-pentene, 1-octene, cyclopentene, norbornene or norbornadiene are polymerized or copolymerized. Preference is given to polymerizing or copolymerizing ethylene, propylene and butene, particularly preferably ethylene and propylene.

If required, hydrogen is added as molecular weight regulator. The total pressure of the polymerization is usually 0.5–150 bar. Preference is given to carrying out the polymerization in the pressure range of 1–40 bar.

If the polymerization is carried out as a suspension or solution polymerization, an inert solvent is used. For example, aliphatic or cycloaliphatic hydrocarbons such as pentane, hexane or cyclohexane can be used. It is also possible to use toluene. Preference is given to carrying out the polymerization in the liquid monomer.

The copolymerization of ethylene with propylene is preferably carried out in liquid propylene or in hexane as suspension medium. In the polymerization in liquid propylene, the ethylene is preferably fed in such an amount that a partial pressure ratio $p_{C3}/p_{C2}$>0.5, in particular >1.0, is established above the liquid phase ($p_{C2}$=partial pressure of ethylene in the gas phase above the suspension: $P_{C3}$=partial pressure of the propylene in the gas phase above the suspension). In the copolymerization in hexane as suspension medium, an ethylene/propylene gas mixture having a propylene content of from 1 to 50 mol %, preferably from 5 to 30 mol %, is added. The total pressure is kept constant during the polymerization by metering in further amounts. The total pressure is from 0.5 to 40 bar, preferably from 1 to 20 bar. The polymerization time is from 10 minutes to 6 hours, preferably from 30 minutes to 2 hours.

The catalysts used according to the invention make possible the preparation of homopolymers, copolymers and block copolymers. Their use makes it possible to control the particle size of the polymers in a targeted way as a function of the preparation conditions of the support. The particular advantage of the catalyst of the invention is therefore that the particle size of the polymers can be matched to the respective requirements of the technology used. Apart from the opportunity of targeted control of the particle size and the particle size distribution, the process of the invention has the further advantage that the polyolefins obtained are present in spherical form and that they have only a low proportion of fines. Further advantages are derived from the preparation technology. The catalyst is able to be prepared in principle by a "single-vessel process", where, with an appropriate reaction procedure, no interfering byproducts are formed and the solvents used can be recycled.

The following examples illustrate the invention.

| | Definitions: |
|---|---|
| MC | metallocene, |
| MAO | methylaluminoxane, |
| TEAL | triethylaluminum |
| $M_w$ | weight average molecular mass in g/mole determined by GPC, |
| $M_n$ | number average molecular mass in g/mole determined by GPC, |
| $M_w/M_n$ | polydispersity |
| $d_{50}$ | mean particle diameter determined by sieve analysis, |
| $T_m$ | melting point determined by DSC. |

EXAMPLE 1

Preparation of the supported catalyst A

The support material used was aluminum oxide C (from Degussa). The mean primary particle size is in the colloidal range and is given by the manufacturer as 13 nm. Prior to use, the oxide was first dehydrated at 110° C. for a period of 16 hours with application of vacuum, subsequently ignited at 400° C. for a period of 24 hours in vacuo and cooled and stored under a gauge pressure of nitrogen of 1.5 bar. The OH content was 0.88 mmol/g of $Al_2O_3$ (method of determination according to Zeriwitinov; Houben-Weyl, Methoden der organischen Chemie (1953) 317). 5 g of aluminum oxide C were suspended in 40 ml of dry toluene. The suspension was subsequently mixed with 24.14 g of a 10% strength MAO solution in toluene (from Witco; 44 mmol of Al) and stirred for 45 minutes. The solvent was then taken off at room temperature in vacuo with moderate stirring. The solid obtained was then resuspended in 40 ml of anhydrous THF. A solution of 3.96 mmol of bisphenol A and 40 ml of TEF was then added to the suspended reaction mixture over a period of 5 minutes and the mixture was stirred for a further 30 minutes. Subsequently, the solvent was taken off at 70° C. in vacuo over a period of 30 minutes with moderate stirring. The fine powder obtained was admixed again with 60 ml of toluene, stirred for 10 minutes, subsequently allowed to stand for 15 minutes and the clear solution obtained above the solid which had settled out was decanted. The solid was then dried at 100° C. in vacuo while stirring. The catalyst support thus prepared was resuspended in toluene and was admixed with a toluene-containing mixture comprising 45 mg of ethylenebis(indenyl)zirconium dichloride (from Witco) and 21.42 mmol of a 10% strength MAO solution. The active zirconocene/MAO complex was allowed to stand for 15 minutes beforehand. After stirring for a further 30 minutes, the toluene was taken off at room temperature and the residue was subsequently washed twice with 40 ml of anhydrous n-pentane and dried in vacuo. This left a supported metallocene catalyst (supported catalyst A) as a fine yellow solid having a metallocene content of 0.48% by weight, which solid changed color to orange to reddish brown after being allowed to stand for a number of days under inert gas.

EXAMPLE 2

Polymerization using supported catalyst A

A 2 l stirred reactor (from Büchi) was, after being made inert, charged at room temperature with 1.42 g of a 10% strength MAO solution (Al[MAO]:Zr[MC]=200) and 200 g of liquid propylene and the mixture was stirred for 5 minutes at 350 revolutions/min. 0.987 g of the supported catalyst A prepared in Example 1 were rinsed into the reactor with a further 300 g of propylene, the stirrer speed was increased to 700 rpm, the mixture was heated to the polymerization temperature of 70° C. and the temperature was kept constant for a period of two hours. The reaction was ended after two hours by flushing off the propylene. This gave 100 g of polypropylene having a mean particle diameter $d_{50}$ according to sieve analysis of 2,000 μm and a proportion of fines (<200 μm) of 4.23% by weight. The polymer particles are spherical ($M_w$=25,000 g/mol; polydispersity 2.5; $T_m$=131° C.).

EXAMPLE 3

Polymerization using supported catalyst A

A 5 l reactor (from Büchi) is, after being made inert, charged at room temperature with 3.64 ml of a 1.011 molar triethylaluminum solution (solvent: hexane; Al[TEAL]:Zr[MC]=100) and 500 g of liquid propylene and the mixture is stirred for 5 minutes at 350 rpm. 1.55 g of the supported catalyst A prepared in Example 1 are rinsed in with a further 1,000 g of liquid propylene, the stirrer speed is increased to 700 rpm, the mixture is heated to the polymerization temperature of 70° C. and the temperature is kept constant for a period of two hours. The reaction is ended after two hours by flushing off the propylene. This gave 80 g of polypropylene having a mean particle diameter $d_{50}$ according to sieve analysis of 710 μm and a proportion of fines (<200 μm) of 1.6% by weight. The polymer particles are spherical ($M_w$=27,000 g/mol; polydispersity 2.5; $T_m$=132° C.).

EXAMPLE 4

Polymerization using supported catalyst A

The experimental procedure of Example 2 was repeated, but using 0.992 g of the supported catalyst A and omitting the addition of the 10% strength MAO solution. This gave 11 g of polypropylene having a mean particle diameter $d_{50}$ according to sieve analysis of 500 μm and a proportion of fines (<200 μm) of 3.6% by weight. The polymer particles are spherical ($M_w$=28,000 g/mol; polydispersity 2.3; $T_m$=136° C.).

EXAMPLE 5

Preparation of the supported catalyst B

The support material used was aluminum oxide C (from Degussa). Prior to use, the oxide wait first dried at 400° C. for a period of 4 hours under a stream of nitrogen. The OH content was 0.99 mmol/g of $Al_2O_3$. 3.75 g of aluminum oxide C were suspended in 40 ml of dry toluene. The suspension was subsequently mixed with 7.65 g of a 30% strength MAO solution in toluene (from Witco; 37.1 mmol of Al) and the mixture was stirred for 45 minutes. The solvent was then taken off at room temperature in vacuo with moderate stirring. The solid obtained was then resuspended in 40 ml of anhydrous THF. A solution of 4.82 mmol of bisphonol A and 40 ml of THF was added to the suspended reaction mixture over a period of 5 min and the mixture was stirred for a further 30 minutes. Subsequently, the solvent was taken off at 70° C. in vacuo over a period of 30 minutes with moderate stirring. The fine powder obtained was admixed again with 60 ml of toluene, stirred for 10 minutes, subsequently allowed to stand for 15 minutes and the clear solution obtained above the solid which had settled was decanted. The solid was then dried at 100° C. in vacuo while stirring. 1.8 g of the support material thus prepared is resuspended in toluene and was admixed with a toluene-containing mixture comprising 36 mg of ethylenebis (indenyl) zirconium dichloride (from Witco) and 3.75 mmol of a 30% strength MAO solution (molar ratio Al:Zr=210). The active zirconocene/MAO complex was allowed to stand for 15 minutes beforehand. After stirring for a further 30 minutes, the toluene was taken off at room temperature and the residue was subsequently washed twice with 40 ml of anhydrous n-pentane and dried in vacuo. This left a fine orange solid having a metallocene content of 2% by weight.

EXAMPLE 6

Polymerization using supported catalyst B

A 2 l stirred reactor (from Büchi) is, after being made inert, charged at room temperature with 200 g of liquid propylene and the liquid is stirred for 5 minutes. 0.250 g of the supported catalyst B prepared in Example 5 is rinsed into the reactor with a further 300 g of propylene, the stirrer speed is increased to 700 rpm, the mixture is heated to the polymerization temperature of 70° C. and the temperature is kept constant for a period of two hours. The reaction is ended after two hours by flushing off the propylene. This gave 100 g of polypropylene having a mean particle diameter $d_{50}$ according to sieve analysis of 1,500 μm and a proportion of fines (<200 μm) of 4% by weight. The polymer particles are spherical ($M_w$=27,000 g/mol; polydispersity 2.3; $T_m$=133° C.).

EXAMPLE 7

Polymerization using supported catalyst B

The experimental procedure of Example 6 was repeated, but using 0.162 g of the supported catalyst B. With a countercurrent of propylene, 0.05 ml of a 1 molar trimethylaluminum/hexane solution was added as scavenger prior to commencement of the polymerization, then 200 g of propylene were passed in and the mixture was stirred for 5 minutes. The catalyst was subsequently added together with a further 300 g of propylene. After a polymerization time of 2 hours at 70° C., the polymerization was interrupted by flushing off the excess propylene. 56 g of a very uniform product having a mean particle diameter $d_{50}$ according to sieve analysis of 1,000 μm and a proportion of fines (<200 μm) of 0.7% by weight were able to be obtained. The polymer particles are spherical ($M_w$=24,000 g/mol; polydispersity 2; $T_m$=131° C.).

EXAMPLE 8

Preparation of the supported catalyst C

The experimental procedure of Example 1 was repeated, but the aluminum oxide C was dried beforehand at 400° C. under a countercurrent of nitrogen for a period of 4 hours. The OH content was 0.99 mmol/g of $Al_2O_3$. 5.8 g of the dried support material were reacted with 11.15 g of a 30% strength MAO solution (57.42 mmol of Al). Subsequently, the reaction product was reacted with 4.305 mmol of bisphenol A (Al[MAO]:bisphenol A=13). The supported catalyst was prepared by addition of a mixture of 48 mg of ethylenebis(indenyl)zirconium dichloride and 12.6 g of a 10% strength MAO solution. After complete drying, this gave a fine, pale yellow powder having a metallocene content of 0.5% by weight.

EXAMPLE 9

Polymerization using supported catalyst C

The experimental procedure of Example 2 was repeated, but using 1.025 g of a 10% strength MAO solution as scavenger (Al[MAO]Zr[MC]=250) and 0.586 g of the solid supported catalyst C. The total amount of liquid propylene was 500 g. This gave 50 g of polypropylene having a mean particle diameter $d_{50}$ according to sieve analysis of 2,000 μm and a proportion of fines (<200 μm) of 4.0% by weight. The polymer particles are spherical ($M_w$=26,000 g/mol; polydispersity 2.5; $T_m$=132° C.).

EXAMPLE 10

Preparation of the supported catalyst D

The experimental procedure of Example 1 was repeated, but the support material aluminum oxide C was dried beforehand at 200° C. under a countercurrent of nitrogen for a period of 4 hours. The OH content was 1.97 mmol/g of $Al_2O_3$. 4.8 g of the dried support material were reacted with 9.18 g of a 30% strength MAO solution (47.28 mmol of Al; Al[MAO]OH[$Al_2O_3$]=5). The reaction product was subsequently reacted with 3.78 mmol of bisphenol A. The supported catalyst was prepared by addition of a mixture of 41.8 mg of ethylenebis(indenyl)zirconium dichloride and 4.7 g of a 30% strength MAO solution. After complete drying, this gave a fine yellow powder having a metallocene content of 0.5% by weight.

EXAMPLE 11

Polymerization using supported catalyst D

Using an experimental procedure similar to Example 2, 1.726 g of a 10% strength MAO solution [Al[MAO]:Zr[MC]=250) and 200 g of liquid propylene were first rinsed into the 2 l reactor after it had been made inert. After stirring for 5 minutes at room temperature, 0.997 g of supported catalyst D and a further 300 g of propylene were metered in. The polymerization time was 2 hours, the polymerization temperature was 70° C., and the excess propylene was subsequently flushed off. This gave 94 g of polypropylene having a mean particle diameter $d_{50}$ according to sieve analysis of 1,000 μm and a proportion of fines (<200 μm) of 5.74% by weight. The polymer particles are spherical ($M_w$=24,000 g/mol; polydispersity 2.7; $T_m$=129° C.).

EXAMPLE 12

Preparation of supported catalyst E

The preparative procedure of Example 10 was repeated, but 4 g of dried aluminum oxide C were reacted with 15.3 g of 30% strength MAO solution (Al[MAO]:OH[$Al_2O_3$]=10). The reaction product was subsequently reacted with 7.92 mmol of bisphenol A. The supported catalyst was prepared by addition of a mixture of 44.0 mg of ethylenebis(indenyl)zirconium dichloride and 10.9 g of 10% strength MAO solution. After complete drying, this gave a fine yellow powder having a metallocene content of 0.52% by weight.

EXAMPLE 13

Polymerization using supported catalyst E

Using an experimental procedure similar to Example 2, 0.54 g of 30% strength MAO solution [Al[MAO]:Zr[MC]=250) and 200 g of liquid propylene were first rinsed into the 2 l reactor after it had been made inert. After stirring for 5 minutes at room temperature, 0.749 g of supported catalyst E and a further 300 g of propylene were metered in. The polymerization time was 2 hours, the polymerization temperature was 70° C., and the excess propylene was subsequently flushed off. This gave 35 g of polypropylene having a mean particle diameter $d_{50}$ according to sieve analysis of 1,000 μm and a proportion of fines (<200 μm) of 4.2% by weight. The polymer particles are spherical ($M_w$=26,000 g/mol; polydispersity 2.6; $T_m$=132° C.).

EXAMPLE 14

Polymerization using support catalyst E

Under a countercurrent of nitrogen, 0.76 ml of a 1.011 molar triethylaluminum solution (dissolved in hexane) is injected into a 2 l stirred autoclave. Subsequently, 0.307 g of supported catalyst E is rinsed in at room temperature with 1 l of dried hexane. The reactor is then heated to the polymerization temperature of 70° C. After the polymerization temperature is reached, the autoclave is evacuated to 0.4 bar and ethylene is metered in. The total pressure is 5 bar and is kept constant during the polymerization. The polymerization is stopped after 2 hours by flushing off the excess ethylene. This gave 21 g of a spherical polymer. The mean particle diameter $d_{50}$ according to sieve analysis is 250 μm, the proportion of fines (<100 μm) is 2%. ($M_w$=104,000 g/mol; polydispersity 2.9; $T_m$=136° C.).

EXAMPLE 15

Preparation of the supported catalyst F

The support was dried by a method similar to Example 8, the subsequent experimental procedure was similar to Example 1. 5.7 g of the dried support material were reacted with 11.3 g of a 30% strength MAO solution (57.4 mmol of Al). Subsequently, 6.29 g of the reaction product were reacted with 5.08 mmol of bisphenol A (Al[MAO]:bisphenol A=8). The supported catalyst was prepared by addition of a mixture of 59 mg of ethylenebis(indenyl)zirconium dichloride and 19.28 g of a 10% strength MAO solution. After complete drying, this gave a fine yellow powder having a metallocene content of 0.7% by weight.

EXAMPLE 16

Polymerization using supported catalyst F

The polymerization was carried out using a method similar to Example 3. 3.43 g of 10% strength MAO solution (Al[MAO]:Zr[MC]=250) were used. The amount of support was 1.50 g. The polymerization time was 2 hours, the polymerization temperature was 70° C. At the end of the polymerization, the excess polypropylene was flushed off. This gave 350 g of polypropylene having a mean particle diameter $d_{50}$ according to sieve analysis of 500 μm and a proportion of fines (<200 μm) of 9.26% by weight. The polymer particles are spherical ($M_w$=25,000 g/mol; polydispersity 2.4; $T_m$=130° C.).

EXAMPLE 17

Polymerization using supported catalyst F

The polymerization was carried out using a method similar to Example 2. 1.13 g of 10% strength MAO solution (Al[MAO]:Zr[MC]=250) were used. However, the supported catalyst F was sieved beforehand. The sieve fraction 14–10 μm was used. The amount of support was 0.494 g. The polymerization time was 2 hours, the polymerization temperature was 70° C. At the end of the polymerization, the excess polypropylene was flushed off. This gave 138 g of polypropylene having a mean particle diameter $d_{50}$ according to sieve analysis of 710 μm and a proportion of fines (<200 μm) of 2.25% by weight. The polymer particles are spherical ($M_w$=26,000 g/mol; polydispersity 2.5; $T_m$=131° C.).

EXAMPLE 18

Preparation of the supported catalyst G

The support was dried using a method similar to Example 8, the subsequent experimental procedure was similar to Example 1. 3.32 g of the dried support material were reacted with 18.02 g of a 10% strength MAO solution (32.87 mmol of Al). The reaction product was subsequently reacted with 1.48 mmol of bisphenol A (Al[MAO]:bisphenol A=22). The supported catalyst was prepared by addition of a mixture of 25 mg of ethylenebis(indenyl)zirconium dichloride and 6.8 g of a 10% strength MAO solution to 4.57 g of the crosslinked support material. After complete drying, this gave a fine yellow powder having a metallocene content of 0.5% by weight.

EXAMPLE 19

Polymerization using supported catalyst G

The polymerization was carried out by a method similar to Example 2. 0.46 g of 30% strength MAO solution (Al[MAO]:Zr[MC]=250) was used. The amount of support was 0.735 g. The polymerization time was 2 hours, the polymerization temperature was 70° C. At the end of the polymerization, the excess propylene was flushed off. This gave 50 g of polypropylene having a mean particle diameter $d_{50}$ according to sieve analysis of 2,000 μm and a proportion of fines (<200 μm) of 4.20% by weight. The polymer particles are spherical ($M_w$=24,000 g/mol; polydispersity 2.4; $T_m$=133° C.).

EXAMPLE 20

Preparation of the supported catalyst H

The support material used was hydrophilic, very finely divided $SiO_2$ (Aerosil 130, from Degussa). The primary particle size is given by the manufacturer as 16 nm. Prior to use, the oxide was first dried at 400° C. for a period of 4 hours under a countercurrent of nitrogen. The OH content was 0.71 mmol/g of $SiO_2$. 2.85 g of dry Aerosil 130 were suspended in 30 ml of dry toluene. Subsequently, the suspension was mixed with 3.88 g of a 10% strength MAO solution in toluene (from Witco; 7.07 mmol of Al) and stirred for 45 minutes. The solvent was then taken off at room temperature in vacuo with moderate stirring. The solid obtained was then resuspended in 30 ml of anhydrous THF. A solution of 0.636 mmol of bisphenol A and 20 ml of THF was added to the suspended reaction mixture over a period of 5 minutes and the mixture was stirred for a further 30 minutes. The solvent was subsequently taken off at 70° C. in vacuo over a period of 30 minutes with moderate stirring. The fine powder obtained was again admixed with 60 ml of toluene, stirred for 10 minutes, subsequently allowed to stand for 15 minutes and the clear solution obtained above the solid which had settled was decanted. The solid was then dried at 100° C. in vacuo while stirring.

The support material thus prepared is resuspended in toluene and was admixed with a toluene-containing mixture comprising 20.25 mg of ethylenebis(indenyl)zirconium dichloride (0.048 mmol) and 5.3 g (9.657 mmol of Al) of a 10% strength MAO solution. The active zirconocene/MAO complex was allowed to stand for 15 minutes beforehand. After stirring further for 30 minutes, the toluene was taken off at room temperature and the residue was subsequently washed twice with 40 ml of anhydrous n-pentane and dried in vacuo. This left a fine yellow solid having a metallocene content of 0.6% by weight, which solid changed color to orange after being allowed to stand for a number of days under inert gas.

EXAMPLE 21

Polymerization using supported catalyst H

A 2 l stirred reactor (from Büchi) is, after being made inert, charged at room temperature with 0.49 g of a 30% strength MAO solution (Al[MAO]:Zr[MC]=200) and 200 g of liquid propylene and the mixture is stirred for 5 minutes at 350 revolutions/min. 0.75 g of the supported catalyst H prepared in Example 20 is flushed into the reactor with a further 300 g of propylene, the stirrer speed is increased to 700 rpm, the mixture is heated to the polymerization temperature of 70° C. and the temperature is kept constant for a period of two hours. The reaction is ended after two hours by flushing off the propylene. This gave 93 g of polypropylene having a mean particle diameter $d_{50}$ according to sieve analysis of 710 μm and a proportion of fines (<200 μm) of 6.7% by weight. The polymer particles are spherical ($M_w$=23,000 g/mol; polydispersity 3.0; $T_m$=132° C.).

COMPARATIVE EXAMPLE I

Preparation of the supported catalyst J

The support was dried using a method similar to Example 8. 5.7 g of the dried aluminum oxide C were suspended in 50 ml of dry toluene. The suspension was subsequently mixed with 10.96 g of a 30% strength MAO solution in toluene (56.4 mmol of Al) and the mixture was stirred for 45 minutes. The solvent was then taken off at room temperature with moderate stirring. 2.8 g of the solid obtained was resuspended in toluene without prior reaction with a crosslinker and mixed by stirring with a toluene-containing mixture-comprising 31 mg of ethylenebis(indenyl) zirconium dichloride and 8.5 g of a 10% strength MAO solution. The active zirconocene/MAO complex was allowed to stand for 15 minutes beforehand. After stirring for 30 minutes, the toluene was taken off at room temperature and the residue was subsequently washed twice with 40 ml of anhydrous n-pentane and dried in vacuo. This left a fine yellow solid having a metallocene content of 0.9% by weight, which solid changes color to orange to reddish brown after being allowed to stand for a number of days under inert gas.

COMPARATIVE EXAMPLE II

Polymerization using supported catalyst J

The polymerization was carried out using a method similar to Example 2. 0.62 g of 10% strength MAO solution (Al[MAO]:Zr[MC]=250) was used. The amount of support was 0.260 g. The polymerization time was 90 minutes, the polymerization temperature was 50° C. At the end of the polymerization, the excess propylene was flushed off. This gave 230 g of polypropylene having a mean particle diameter $d_{50}$ according to sieve analysis of 1,000 μm and a proportion of fine (<200 μm) of 4.13% by weight. The polymer particles are not spherical but comprise irregularly structured, lumpy agglomerates ($M_w$=35,000; polydispersity 2.5; $T_m$=33° C.).

COMPARATIVE EXAMPLE III

Polymerization using supported catalyst J

The perimental procedure was similar to Example 2. In place of MAO, 0.41 ml of a 1.011 molar triethylaluminum solution (solvent: hexane; Al[TEAL]:Zr[MC]=100) was used. The amount of support was 0.251 g. The polymerization time was 60 minutes, the polymerization temperature was 50° C. At the end of the polymerization, the excess propylene was flushed off. This gave 360 g of polypropylene having a mean particle diameter $d_{50}$ according to sieve analysis of 1,000 μm and having a proportion of fines (<200 μm) of 2.53% by weight. The polymer particles are not spherical but comprise irregularly structured, lumpy agglomerates ($M_w$=37,000 g/mol; polydispersity 2.4; $T_m$=133° C.).

EXAMPLE A1)

Synthesis of crosslinked supports having different MAO contents and degrees of crosslinking, and their characterization 5.08 g of an aluminum oxide C dried at 400° C. for 4 hours (0.99 mmol of OH/g of $Al_2O_3$) were suspended in 110 ml of toluene. Subsequently, in a molar ratio Al(MAO):OH ($Al_2O_3$)=10, 10.36 g (50.26 mmol of Al) of a 30% strength methylaluminoxane solution in toluene were added and the mixture was stirred for 30 minutes at room temperature. The solvent was then taken off in vacuo. The powder prepared was resuspended in 90 ml of THF. A solution of 1.48 g of bisphenol A in 10 ml of THF was then added to the suspension (molar ratio Al(MAO):bisphenol A=7.8) and the mixture was stirred for a further 30 minutes. The solvent was removed at 50° C. in vacuo. The fine solid obtained was again taken up in 55 ml of toluene, stirred for 5 minutes and the supernatant clear solution was subsequently decanted (determination of Al in the wash solution gave a value <0.03 mol %; based on moles of Al in the MAO used). The residue was dried at 100° C. in vacuo, washed again at room temperature with n-pentane and dried in vacuo. The free-flowing solid obtained was characterized in detail.

| Toulene-extractable proportion of MAO (after 3 hours): | |
| --- | --- |
| - at room temperature | 0.03 mol % (based on moles of Al in the MAO used) |
| - at 70° C. | 0.07 mol % |
| Particle size: | 3–5 μm |
| BET surface area: | 160 m²/g |

EXAMPLES A2 to A10

The examples A2 to A10 were prepared by the same synthetic procedure as A1, but different molar ratios of MAO and bisphenol A were set. The synthetic parameters and the results of characterization are shown in Table 1.

COMPARATIVE EXAMPLE B1)

Synthesis of uncrosslinked supports having different proportions of MAO, and their characterization 5.42 g of an aluminum oxide C dried at 400° C. for 4 hours (0.99 mmol of OH/g of $Al_2O_3$) were suspended in 100 ml of toluene. Subsequently, in a molar ratio Al(MAO):OH ($Al_2O_3$)=10, 11.06 g (53.66 mmol of Al) of a 30% strength methylaluminoxane solution in toluene were added and the mixture was stirred for 30 minutes at room temperature. The solvent was then taken off in vacuo. A crosslinking step was omitted. The fine solid obtained was taken up again in 60 ml of n-pentane, washed for 5 minutes and dried in vacuo. The free-flowing solid obtained was characterized in detail.

| Toluene-extractable proportion of MAO (after 3 hours): | |
| --- | --- |
| - at room temperature | 42 mol % |
| - at 70° C. | 45 mol % |
| Particle size: | 0.5–0.8 μm |
| BET surface area: | 114 m²/g |

EXAMPLES B2 to B4

The examples B2 to B4 were prepared by the synthetic procedure B1), but the proportion of MAO on the support oxide was altered and crosslinking with bisphenol. A was omitted as in Example B1. The synthetic parameters and the results of characterization are shown in Table 1.

TABLE 1

Results of the support characterization

| Experimental example | Synthetic parameters | | Extraction sol. proportion of MAO* [mol %] | |
|---|---|---|---|---|
| | Al (MAO): OH (Al₂O₃) [mol/mol] | Crosslinking Al (MAO): bisphenol A [mol/mol] | Room temperature | 70° C. |
| A1 | 10 | 7.8 | 0.03 | 0.07 |
| A2 | 1.6 | 7.8 | 0.03 | 0.04 |
| A3 | 5 | 7.8 | 0.02 | 0.05 |
| A4 | 10 | 12 | — | 0.06 |
| A5 | 10 | 22 | — | 0.08 |
| A6 | 20 | 7.8 | 0.04 | 0.05 |
| A7 | 20 | 12 | — | 0.06 |
| A8 | 20 | 22 | — | 0.15 |
| A9 | 20 | 25 | — | 1 |
| A10 | 20 | 30 | — | 1.4 |
| Comparative Example | | | | |
| B1 | 10 | uncrosslinked | 42 | 45 |
| B2 | 1.6 | uncrosslinked | 1.1 | 1.5 |
| B3 | 5 | uncrosslinked | — | 39 |
| B4 | 20 | uncrosslinked | — | 60 |

*based on moles of Al (MAO) used

What we claim is:

1. Process for preparing a catalyst support, which comprises a) dehydrating a macroporous, particulate hydrophilic aluminum oxide, silicon oxide, titanium oxide or zirconium oxide or a mixture of said oxides or their mixed oxides, with a mean primary particle size of 3 nm to 110 nm at from 110 to 800° C., b) reacting the product of step a) with an aluminoxane and subsequently c) reacting the product of step b) with polyfunctional organic crosslinkers.

2. Process as claimed in claim 1, wherein bifunctional crosslinkers are used in step c).

3. Process as claimed in claim 1, wherein diols, diamines or diepoxide compounds or mixtures thereof are used as crosslinkers step c).

4. Catalyst support produced by the process of claim 1.

* * * * *